UNITED STATES PATENT OFFICE.

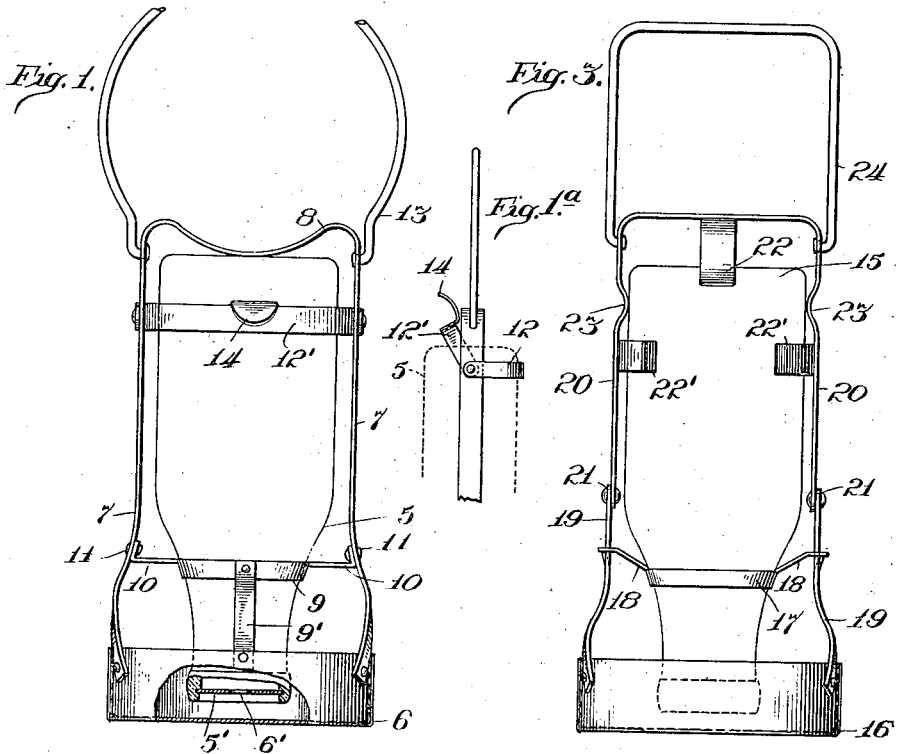
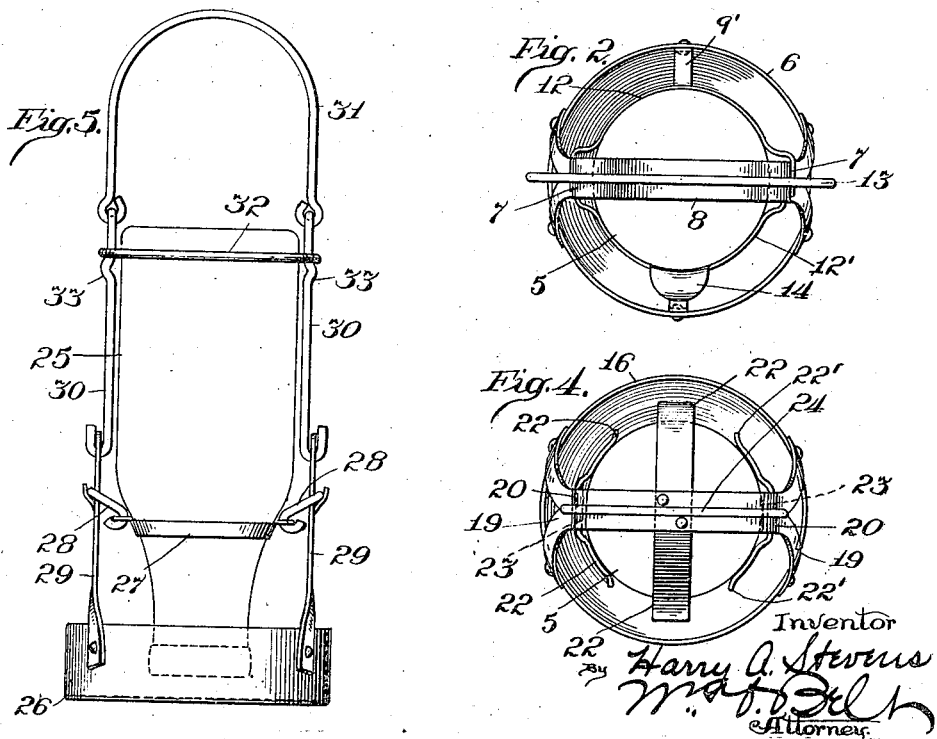

HARRY A. STEVENS, OF BATAVIA, ILLINOIS.

WATER-FOUNTAIN AND FEED-HOPPER.

1,251,935.    Specification of Letters Patent.    Patented Jan. 1, 1918.

Application filed April 16, 1917.   Serial No. 162,239.

*To all whom it may concern:*

Be it known that I, HARRY A. STEVENS, a citizen of the United States, residing at Batavia, in the county of Kane and State of Illinois, have invented certain new and useful Improvements in Water-Fountains and Feed-Hoppers, of which the following is a specification.

This invention relates to a water fountain and feed hopper for poultry and the like and has for its object to provide a durable and inexpensive device, the parts of which may be readily separated for cleaning and filling and which is adapted to hold a quantity of water or feed and deliver the same as needed for consumption and to be hung out of the way when not in use.

Further objects and advantages of my invention will be apparent as it is better understood by reference to the following specification when read in connection with the accompanying drawing, illustrating the preferred embodiments thereof, in which—

Figure 1 is a side elevation of the device according to my invention;

Fig. 1ᵃ is an elevation on a reduced scale of a portion of the structure illustrated in Fig. 1;

Fig. 2 is a top plan view of the structure illustrated in Fig. 1:

Fig. 3 is a side elevation of a slightly different form of my invention;

Fig. 4 is a top plan view of the structure illustrated in Fig. 3, and

Fig. 5 is a side elevation of still another form of my invention.

Referring to Figs. 1, 1ᵃ and 2, 5 indicates an inverted shouldered container, preferably an ordinary milk bottle, which is adapted to contain a quantity of water or feed. The mouth of the container 5 is disposed within the pan 6 into which the water or feed is delivered for consumption. Preferably a paper cap 5′ having an opening 6′ therein is disposed in the mouth of the container 5. Secured to opposite sides of the pan 6 are a pair of upright members 7, preferably connected in this form of my invention by an integral cross-bar 8.

A collar 9, adapted to surround the neck of the container 5 below the shoulder thereon, is connected to the upright members 7 by arms which are riveted or otherwise secured thereto at 11. Guards 9′ are secured to the collar 9 and to the rim of the pan 6. The container 5 is thus supported with its mouth in spaced relation with the bottom of the pan 6. The cross-bar 8 is preferably bent downwardly as indicated in Fig. 1 to engage the bottom of the container 5. A semi-annular member 12 is fixedly secured to the upright members 7 embracing one side of the container 5 adjacent its bottom and a semi-annular member 12′ is pivotally secured to the upright members 7 opposite the member 12 and is adapted to be swung by grasping the finger piece 14 to the position indicated in Fig. 1ᵃ to release the receptacle 5. The bail 13 is connected to the upright members 7, thus providing means whereby the device may be readily transported.

Referring to Figs. 3 and 4, the container 15 is supported in inverted position above the pan 16 by a collar 17 surrounding its neck below the shoulder and connected by arms 18 to upright members 19 fastened to the pan 16. A U-shaped member having arms 20 is hingedly connected at 21 to the upright members 19 and is provided with a spring clip 22 engaging the sides of the container 15 adjacent the bottom thereof to prevent lateral displacement thereof. The arms 20 are bent inwardly at 23 to engage the sides of the container 15 and assist in maintaining the latter rigidly in position. Spring clips 22′ are secured to the arms 20 adjacent the bent-in portions 23 and engage the sides of the container 15. A bail 24 is connected to the U-shaped member to facilitate handling of the device.

Referring to Fig. 5 the container 25 is supported above the pan 26 by a collar 27 connected by links 28 to upright members 29 fastened to the pan 26. Extensions 30, preferably of wire, are hingedly connected to the upright members 29 and to a bail 31 which facilitates handling of the device. A wire ring 32 surrounds the container 25 adjacent its bottom, downward movement of the ring 32 being limited by humps 33 in the extensions 30.

The manner of inserting the container in each of the different forms of my invention is substantially similar. In Fig. 1 the neck of the container is inserted in the collar 9 after the member 12′ has been swung to the position indicated in Fig. 1ᵃ. The member 12′ is then returned to its normal position and thereafter holds the container against lateral displacement. In Fig. 3 the neck of the container is inserted in the collar 17, the U-shaped member being first swung about its hinged connection after which the spring clips 22 and 22' are spread sufficiently to permit the container to pass between the ends thereof. The U-shaped member is then returned to its normal position. In Fig. 5 the neck of the container is inserted in the collar 27 after the extensions 30 have been moved to one side. The ring 32 is then raised sufficiently to clear the bottom of the container and the extensions 30 are returned to their normal position. The ring 32 is then permitted to drop to the position indicated in the drawing.

In use the container is filled with water or feed. The cap 5' is disposed in the mouth of the container which is inserted in its support and inverted. As soon as enough water has flowed from the container into the pan to cover the mouth of the former further egress of water is prevented until the liquid level is lowered by evaporation or consumption. Dry or moist feed will similarly flow from the container into the pan, the contents of the pan being replenished from the container from time to time as consumed.

My invention provides a durable and inexpensive water fountain and feed hopper since the parts may be constructed of galvanized strips of iron or wire. It is desirable to employ a glass container so that the contents thereof may be readily noted and I have, therefore, devised my invention to employ an ordinary milk bottle which, if broken, may be readily replaced. My invention is simple in construction and effective in operation and presents numerous advantages over similar devices heretofore in use.

It will be apparent that various changes may be made in the form, construction and arrangement of the parts without departing from the spirit and scope of the invention or sacrificing any of its material advantages, the forms hereinbefore described being merely preferred embodiments thereof.

I claim:

1. A device of the character described, comprising an inverted shouldered container, a pan, upright members secured to said pan, means supported on said upright members and embracing said container below the shoulder thereon, extensions hingedly secured to said upright members, and means supported on said extensions engaging said container adjacent its base to prevent lateral displacement thereof.

2. A device of the character described, comprising an inverted shouldered container, a pan, upright members secured to said pan, means supported on said upright members embracing said container below the shoulder thereon, a U-shaped member hingedly secured to said upright members, and a spring clip on said U-shaped member to engage said container adjacent its base and prevent lateral displacement thereof.

3. A device of the character described, comprising an inverted shouldered container, a pan, upright members secured to said pan, a collar supported on said upright members and embracing said container below the shoulder thereon, a U-shaped member hingedly secured to said upright members, the arms of said U-shaped member being bent inwardly to engage said container adjacent its base, and a spring clip on said U-shaped member to prevent lateral displacement of said container.

4. A device of the character described, comprising an inverted shouldered container, a pan, upright members secured to said pan, a collar supported on said upright members and embracing said container below the shoulder thereon, a U-shaped member hingedly secured to said upright members, the arms of said U-shaped member being bent inwardly to engage said container adjacent its base, a spring clip on said U-shaped member to engage said container adjacent its base, a pair of spring clips secured to the arms of said U-shaped members below the inwardly bent portions thereof, and a bail connected to said U-shaped member.

5. A device of the character described, comprising an inverted shouldered glass container, a pan, upright members secured to said pan, a collar supported on said upright members and embracing said container below the shoulder thereon, a U-shaped member hingedly secured to said upright members, and a spring clip on said U-shaped member to prevent lateral displacement of said container.

HARRY A. STEVENS.

Witnesses:
MAYBELLE STEVENS,
MARY A. ST. JOHN.